Patented Jan. 22, 1946

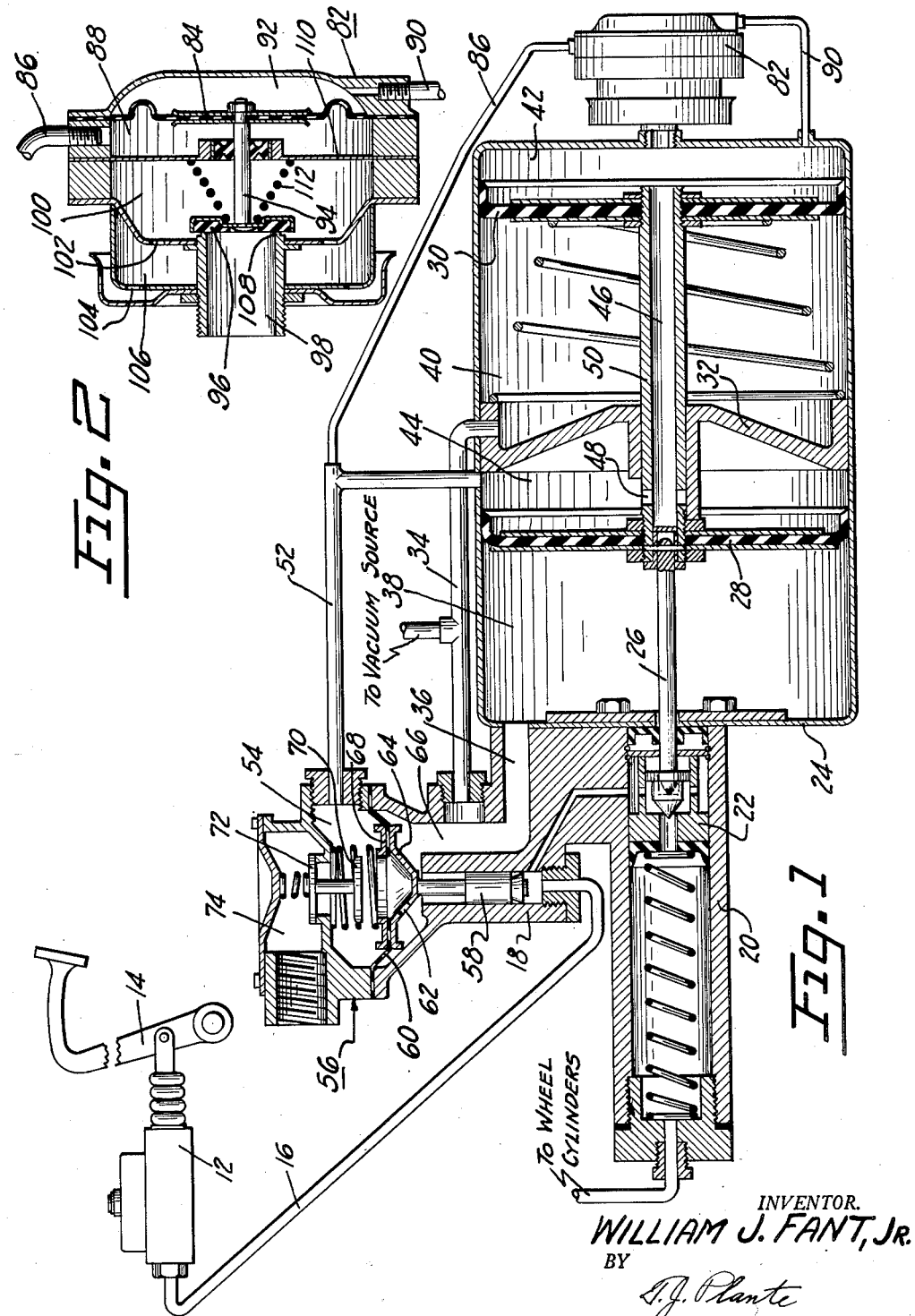

2,393,524

UNITED STATES PATENT OFFICE 2,393,524

CONTROL FOR FLUID PRESSURE POWER DEVICES

William J. Fant, Jr., South Bend, Ind., assignor to Bendix Aviation Corporation, South Bend, Ind., a corporation of Delaware Application January 24, 1944, Serial No. 519,533

6 Claims. (Cl. 121—38)

This application relates to controls for fluid pressure power devices, particularly of the differential air pressure type.

Where differential air pressure power cylinders are used to operate brakes and the like it is important that the application of the power cylinder be rapid, i. e., that the change of pressure required to do the work be accomplished quickly. This is particularly true in power devices which depend on a differential between air at atmospheric pressure on the one hand and vacuum on the other hand, inasmuch as the differential is limited. Where a large power cylinder or booster is used, it often is the case that an excessively large amount of fluid must pass through relatively long and relatively small diameter pipes, in order to attain the necessary rapidity of actuation.

It is an object of the present invention to provide means for bringing a power device or booster of the differential air pressure type into operation rapidly and efficiently.

A further object of the present invention is to provide simple and inexpensive means for thus improving the operation of a power device or booster.

A still further, and more specific, object of the present invention is to provide valve means which will increase the speed of application of a power device or booster, but which will not participate in the release of said power device or booster.

Other objects and advantageous features of my invention will become apparent during the course of the following description, reference being had therein to the accompanying drawing, in which:

Figure 1 is a diagrammatic view showing a fluid pressure power system incorporating a fluid pressure power device and improved control means therefor; and Figure 2 is a section taken through the "fast application valve" of Figure 1.

My invention is applicable to any fluid power transmission system. Accordingly, it will be appreciated that the fluid power transmission system shown in Figure 1 is used for the purpose of illustration only, and this invention is not in any way limited to such a system. The illustrated system provides for the hydraulic transmission of pressure which is created both by a manually operated master cylinder and a differential air pressure power device or booster which is under the control of the manually operated master cylinder. Thus, the master cylinder 12 may be operated by a manually controlled pedal 14, and may be connected by a hydraulic line 16 both to a valve operating cylinder 18 and to an auxiliary master cylinder 20. The piston 22 of the auxiliary master cylinder 20 is adapted to be actuated both by the pressure of liquid coming from master cylinder 12, and by a differential air pressure power cylinder 24 acting through a rod 26.

My invention is particularly applicable where it is necessary to use an especially effective power cylinder 24, although it is not limited to such use, but may be applied to a power cylinder of any size or description. In the present case, I have chosen to illustrate a power cylinder of the "tandem" type, which may be particularly powerful without having an excessively large diameter. Two connected pistons 28 and 30 are adapted to act together in producing force on the piston 22, both pistons 28 and 30 acting through the rod 26. A partition 32 divides the large power cylinder 24 into what are essentially two separate power cylinders arranged in tandem.

The power cylinder 24 in its illustrated form, is adapted to have both pistons 28 and 30 submerged in vacuum so long as it remains released. A conduit 34 and passage 36 connect chamber 38, which is in front of piston 28, to a suitable vacuum source, such as the conventional intake manifold, conduit 34 also being directly connected to chamber 40, which is between partition 32 and piston 30. Chamber 42 at the rear of piston 30 is at all times in communication with chamber 44 at the rear of piston 28 through the axial passage 46 and radial openings 48 of the hollow sleeve 50 which rigidly connects the pistons 28 and 30. Chamber 44 is connected by means of a conduit 52 with a control chamber 54 in an operating valve 56, the operating valve 56 being adapted to regulate the air pressure in chamber 54 and conduit 52 in accordance with opposed pressures of liquid from master cylinder 12 acting upwardly on the piston 58 and a reactionary pressure acting downwardly on the diaphragm 60. In the illustrated position of the operating valve, which is released position, the chamber 54 is connected with the vacuum pipe 34 through an opening in the center of diaphragm 60, a plurality of openings 62 in the member 64, and a passage 66 in the valve body. It is apparent that, while the power cylinder 24 remains released, both pistons 28 and 30 are submerged in vacuum, and there is no differential air pressure over either of said pistons tending to move them in the applying direction.

When manual pressure is applied to the master cylinder 12, a pressure is exerted against piston 58 tending to move the valve seat 68 upwardly into contact with the poppet 70, cutting off the connection between the vacuum source and chamber 54 of the operating valve. Further upward movement of valve seat 68 causes the poppet 72 to leave its seat, admitting air at atmospheric pressure into chamber 54 from chamber 74, which is open to atmosphere. Air now moves past poppet 72 into chamber 54 and conduit 52, whence it enters chamber 44 at the rear of piston 28, and, passing through the hollow sleeve 50, enters the chamber 42 at the rear of piston 30. Since chambers 38 and 40 are still connected to the vacuum source, a pressure differential is created over the pistons 28 and 30, tending to move them in the direction of the hydraulic cylinder 20, to apply force on the piston 22.

Because of the large volume of chambers 42 and 44 in power cylinder 24 which have to be filled, partially or wholly, with air in order to build up the pressure acting on the power cylinder pistons, a certain time lapse occurs before the power is fully applied. Furthermore, the distance through which the air must pass from the operating valve 56 to the power cylinder 24, and particularly to the most remote part of the power cylinder, tends to emphasize this time lapse or lag. It is generally not desirable that the diameter of the connecting conduits be very large, or that the size of the operating valve 56 and its poppets 70 and 72 be increased to speed up the operation of the power cylinder. Use of large poppets in the operating valve 56 has the disadvantages that it requires a higher initial pressure in the master cylinder 12 to operate the operating valve 56, and that it gives a poorer metering effect of air past the poppet 72.

I have provided inexpensive means whereby the operation of the power cylinder 24 can be effectively speeded up without increasing the size of the operating valve or the conduits. Said means (to which the term "fast application valve" may conveniently be applied) comprises essentially a valve element adapted to connect the power cylinder directly to an auxiliary pressure source (in this case the atmosphere), and a pressure responsive movable element for opening said valve whenever the rate of pressure change in the power cylinder lags excessively beyond the rate of pressure change in the operating valve 56.

A compact and efficient form of my "fast application valve" is illustrated generally at 82 in Figure 1, and is shown in section in Figure 2.

A pressure responsive movable wall, such as the diaphragm 84, is subjected on opposite sides to the pressure prevailing in control chamber 54 of the operating valve 56, and to the pressure prevailing in control chamber 42 of the power cylinder 24. To this end a conduit 86, which may be a branch of conduit 52, is connected to a chamber 88 at one side of the diaphragm 84, and a conduit 90 which is directly connected to chamber 42 of the power cylinder is connected to chamber 92 at the opposite side of diaphragm 84. The diaphragm 84 is operatively connected by suitable means, such as the rod 94, to a valve element which is adapted to control the admission of air directly to chamber 42 of the power cylinder. The valve element may conveniently be a poppet, such as the poppet illustrated at 96, which is adapted to seat at one end of the passage 98, said passage being directly connected to chamber 42 of the power cylinder. Since chamber 100 above the poppet 96 is directly connected to the atmosphere by means of openings 102 and 104 in the valve casing (an air cleaner 106 may be located between said openings 102 and 104), movement of poppet 96 away from its seat 108 will admit air directly to control chamber 42 of the power cylinder, the distance through which the air must travel being almost negligible, and the size of the openings and passages through which it moves being relatively large. A sealed partition 110 is provided between chambers 100 and 88.

When the power cylinder and "fast application valve" are in released position, the diaphragm 84 is vacuum suspended because control chamber 42 of the power cylinder, to which chamber 92 of the fast application valve is connected, is in communication with control chamber 54 of the operating valve 56, to which chamber 88 of the fast application valve is connected, both chambers 42 and 54 being in communication with the vacuum source. Accordingly, in released position, the pressures in chambers 88 and 92 of the fast application valve will be the same.

In the event of a fast or emergency application of the brakes or the like, which the power cylinder is adapted to operate, there is, as explained above, a slight delay or lag before the control chambers 42 and 44 of the power cylinder reach the pressure determined by the operating valve 56, i. e. the pressure prevailing in chamber 54.

Because of this lag a pressure differential is created over diaphragm 84. Since the pressure change in control chamber 54 in operating valve 56, is more rapid than the pressure change in the control chambers 42 and 44 of the power cylinder, a corresponding pressure difference will occur in chambers 88 and 92 of the fast application valve because they are connected respectively to chambers 54 of the operating valve 56 and control chamber 42 of the power cylinder 24. Whenever this pressure acting on diaphragm 84 becomes sufficient to overcome the resistance of the spring 112, the poppet 96 will be lifted from its seat by movement of the diaphragm 84, and air will be admitted directly to chamber 42 of the power cylinder, tending to rapidly raise the pressure in the power cylinder, and speed the application thereof. It should be noted that, because of the small volume of chamber 88 in the fast application valve, said chamber can be filled with air almost immediately after actuation of the operating valve 56.

The pressure lag necessary to open the valve 96 depends upon the strength of the spring 112. This spring strength may be predetermined to permit operation of the fast application valve at whatever pressure differential, or lag, such operation is desired. After opening, the fast application valve remains open until a balance is established between the power cylinder control chamber and the operating valve control chamber. At this time the fast application valve is closed by the spring pressure and remains closed until another rapid application of power is required. It will be apparent that the fast application valve participates only in the application of the power cylinder, and not in the release thereof. In other words, as air is evacuated from chambers 42 and 44 to release the power cylinder 24, all this air passes through conduit 52 and chamber 54 of the operating valve. Fast release of the power cylinder is not usually necessary, even though the application of the power cylinder must be extremely rapid. By providing a fast application valve which participates only in application of the power cylinder, I attain the advantages of a relay valve or like device, but I use a device which is simpler and less expensive than any heretofore proposed, and, additionally, requires less piping.

Ordinarily, it probably will not be desired to have the fast application valve play any part in a normal or slow application, the existing poppets and conduits usually having sufficient capacity to maintain a balance in all parts of the control system during an unhurried application. However, by using a light spring in the fast application valve, the operation thereof may be made extremely sensitive.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a fluid pressure power braking system having a power cylinder and an operating valve, each of which contains a control chamber, and conduit means providing direct and uninterrupted communication between said control chambers, a fast application valve located near the control chamber of the power cylinder and having a passage connecting the control chamber of the power cylinder directly with a fluid pressure corresponding to that which will prevail in the power cylinder when it is fully applied, a valve element adapted to open and close said passage, and a fluid pressure responsive member connected to said valve element to actuate the same, said fluid pressure responsive member being urged in a direction to open the passage by the pressure prevailing in the control chamber of the operating valve, and being urged in a direction to close the passage by the pressure prevailing in the control chamber of the power cylinder.

2. In a fluid pressure system having a power device adapted to create pressure to do work and an operating valve, each of which contains a control chamber, said control chambers being interconnected but subject to possible lag in transmission of fluid therebetween, a fast application valve located near the control chamber of the power device and having a passage connecting the control chamber of the power device directly with a fluid pressure corresponding to that which will prevail in the power device when it is fully applied, an element adapted to open and close said passage, and a fluid pressure responsive member connected to said element to actuate the same, said fluid pressure responsive member dividing said fast application valve into two chambers and permanently preventing direct communication therebetween, one of the chambers of said fast application valve being connected to the control chamber of the operating valve, and the other of the chambers of said fast application valve being connected to the control chamber of the power device.

3. In a fluid pressure power braking system having a power cylinder and an operating valve, each of which contains a control chamber, and conduit means providing direct and uninterrupted communication between said control chambers, a fast application valve located near the control chamber of the power cylinder and having a passage connecting the control chamber of the power cylinder directly with a fluid pressure corresponding to that which will prevail in the power cylinder when it is fully applied, a valve element adapted to open and close said passage, a fluid pressure responsive member which divides the fast application valve into two chambers and which is connected to said valve element to actuate the same, said fluid pressure responsive member serving permanently to prevent direct communication between the chambers of said fast application valve, means for yieldably biasing the poppet to the position closing the passage, a conduit connecting one chamber of the fast application valve to the control chamber of the operating valve, and a conduit connecting the other chamber of the fast application valve directly to a part of the power cylinder remote from the operating valve, said fluid pressure responsive member being urged in a direction to open the aforesaid passage by the pressure prevailing in the former conduit, and being urged in a direction to close the passage by the pressure prevailing in the latter conduit.

4. In a fluid pressure system having a differential air pressure power device adapted to create pressure to do work and an operating valve, each of which contains a control chamber and a constant pressure chamber, said control chambers being inter-connected to permit actuation of the power cylinder under control of the operating valve, a fast application valve located near the control chamber of the power device and having a passage connecting the control chamber of the power device directly with a fluid pressure corresponding to that which will prevail in the power device when it is fully applied, an element adapted to open and close said passage, a fluid pressure responsive member connected to said element to actuate the same and arranged to divide the fast application valve into two chambers, conduit means providing uninterrupted communication among one of the chambers of the fast application valve, the control chamber of the operating valve, and the control chamber of the power cylinder, and independent conduit means connecting the other chamber of the fast application valve directly to the control chamber of the power device.

5. In a fluid pressure system having a differential air pressure power device adapted to create pressure to do work provided with a control chamber, an operating valve also provided with a control chamber, and a conduit interconnecting said control chambers to permit actuation of the power cylinder under control of the operating valve, a fast application valve located near the control chamber of the power device and having a passage ocnnecting the control chamber of the power device directly with a fluid pressure corresponding to that which will prevail in the power device when it is fully applied, an element adapted to open and close said passage, a fluid pressure responsive member connected to said element to actuate the same and arranged to divide the fast application valve into two chambers, a conduit providing communication of one of the chambers with the conduit which interconnects the control chambers of the operating valve and power device, and a conduit connecting the other chamber directly to the control chamber of the power device, the last-mentioned conduit being connected to the control chamber of the power device at a point remote from the connection of the first-mentioned conduit to the control chamber of the power device.

6. In a fluid pressure power braking system comprising a vacuum power device having a pressure responsive movable wall dividing the power device into a control chamber and a vacuum chamber, an operating valve having a control chamber, and a connection providing uninterrupted communication between the control chamber of the vacuum power device and the control chamber of the operating valve, a fast application valve located near the control chamber of the vacuum power device and having a passage connecting the control chamber of the power device directly with the atmosphere, an element adapted to open and close said passage, a diaphragm connected to said element to actuate the same and arranged to divide the fast application valve into two chambers and permanently seal them from one another, a conduit connecting one of the chambers to the control chamber of the operating valve, and a second conduit connecting the other chamber directly to the control chamber of the vacuum power device.

WILLIAM J. FANT, JR.